United States Patent [19]

Takahashi et al.

[11] Patent Number: 4,503,194
[45] Date of Patent: Mar. 5, 1985

[54] PROCESS FOR PREPARING HEAT-RESISTANT RESINS

[75] Inventors: Hiroshi Takahashi, Yokkaichi; Teruhisa Goto, Suzuka, both of Japan

[73] Assignee: Mitsubishi Petrochemical Company Limited, Tokyo, Japan

[21] Appl. No.: 528,539

[22] Filed: Sep. 1, 1983

[30] Foreign Application Priority Data

Sep. 1, 1982 [JP] Japan .................................. 57-152110

[51] Int. Cl.³ .............................................. C08F 8/12
[52] U.S. Cl. .................................. 525/329.5; 525/366; 525/367; 525/369; 526/283
[58] Field of Search ...................... 525/329.5, 366, 367, 525/369; 526/283

[56] References Cited

U.S. PATENT DOCUMENTS 4,412,044  10/1983  Takahashi et al. ................ 525/329.5

*Primary Examiner*—John Kight
*Assistant Examiner*—Kriellion Morgan
*Attorney, Agent, or Firm*—Robert E. Burns; Emmanuel J. Lobato; Bruce L. Adams

[57] ABSTRACT

A polymer produced through ring opening of a 5-norbornene-2-carboxylate ester or a derivative thereof is dissolved in an organic solvent miscible with water and is subjected to hydrolysis by addition thereto of an alkali substance until at least a portion of the polymer is separated out. Then, water is added to the reaction mixture to dissolve the separated-out polymer, and the resulting solution is again subjected to hydrolysis treatment, which is followed by addition thereto of an acid to neutralize the resulting hydrolyzate. Thus, a polymer resin having excellent thermal resistance or a polymer resin of improved color shade or transparency can be obtained.

8 Claims, No Drawings

PROCESS FOR PREPARING HEAT-RESISTANT RESINS

BACKGROUND OF THE INVENTION

1. Field of the Art

This invention relates to a process for preparing a resin having five-membered rings and double bonds in its main polymeric chain and having high thermal resistance as well as excellent stiffness and impact resistance.

In petrochemical industries, naphtha obtained from petroleum fractions has been subjected to thermal decomposition to produce olefins such as ethylene and propylene. These olefins have been used for production of chemical materials such as ethylene oxide and acrylic acid as well as resin materials such as polyethylene and polypropylene.

However, almost none of the fractions having 5 carbon atoms which are obtained as by-products in the thermal decomposition of naphtha are being utilized industrially except for isoprene as a starting material for synthetic rubber, and most of these fractions are being consumed as fuel.

2. Prior Art

The content of cyclopentadiene is one of the highest of the components in these $C_5$ fractions. Also cyclopentadiene has high reactivity, and thus its utilization can be expected to be developed to provide novel products of high added value such as cyclopentane and norbornene derivatives.

Among them, a polymer which can be obtained by subjecting a norbornene derivative monomer to polymerization through ring opening in the presence of a metathesis catalyst containing tungsten or molybdenum is very attractive as a novel engineering plastic. Especially, a possible polymer through ring opening of 5-norbornene-2-carboxylic acid, which is derived from cyclopentadiene and acrylic acid by the Diels-Alder reaction, has the possibility of providing engineering plastics having high heat-resistance because of the carboxylic groups contained therein.

However, it is difficult to cause a monomer such as 5-norbornene-2-carboxylic acid to undergo polymerization through ring opening because of the strong polarity of its carboxyl group. Thus, direct polymerization through ring opening of 5-norbornene-2-carboxylic acid has not been successfully accomplished on an industrial basis.

A process for preparing a polymer through ring opening of 5-norbornene-2-carboxylic acid is proposed in Japanese Laid-Open Patent Application No. 65018/1981 specification, wherein a certain norbornene derivative is converted into the corresponding ester and then is subjected to polymerization through ring opening, which is followed by hydrolysis of the ester groups.

This process, however, comprises dissolving the ester polymer in an organic solvent and hydrolyzing it in one stage by addition thereto of an alkali substance. The polymer resulting from the ring opening has deficient thermal resistance.

As a result of our intensive research directed toward improving the thermal resistance and stiffness of product polymers, we have found that the desired thermal resistance and other characteristics can be markedly improved by carrying out the hydrolysis treatment in two stages.

SUMMARY OF THE INVENTION

Subject matter

According to the present invention in one aspect thereof, briefly summarized, there is provided a process for preparing a heat-resistant resin which comprises: dissolving in an organic solvent miscible with water a polymer produced through ring opening of a 5-norbornene-2-carboxylate or a derivative thereof, said polymer comprising a recurring unit represented by the formula

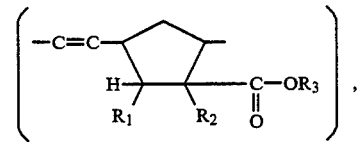

wherein $R_1$ is hydrogen, an alkyl group or a phenyl group, $R_2$ is hydrogen or an alkyl group, and $R_3$ is an alkyl group; adding an alkali substance to the resulting solution thereby to subject the resulting mixture to a first-step hydrolysis treatment until at least a portion of the polymer is separated out; adding water to the reaction mixture to dissolve the separated-out polymer thereby to subject the resulting solution to a second-step hydrolysis treatment; and then neutralizing the resulting hydrolyzate with an acid.

According to the present invention in another aspect thereof, there is also provided a process for preparing a heat-resistant resin which comprises: dissolving in an organic solvent miscible with water a polymer produced through ring opening of a 5-norbornene-2-carboxylate or a derivative thereof, said polymer comprising a recurring unit represented by the formula

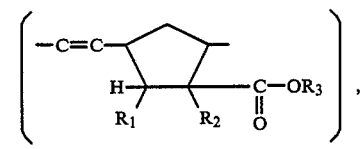

wherein $R_1$ is hydrogen, an alkyl group or a phenyl group, $R_2$ is hydrogen or an alkyl group, and $R_3$ is an alkyl group; adding an alkali substance to the resulting solution and thereby to subject the resulting mixture to a first-step hydrolysis treatment in the organic solvent containing not more than 0.5 part by weight of water per part by weight of the solvent; adding water thereto to subject the mixture to a second-step hydrolysis treatment in an organic solvent containing more than 0.5 part by weight of water per part by weight of the solvent; and then neutralizing the resulting hydrolyzate with an acid.

Utility

In comparison with a polymer obtained by ring opening by the conventional one-step hydrolysis process, the polymer in accordance with the above mentioned two-step hydrolysis process has markedly improved thermal resistance as well as enhanced color shade and transparency due to a decrease in catalyst residues. Furthermore, alkali residues in the resulting polymer can be decreased because neutralization and washing in the neutralization step are amply performed.

According to the invention, also, resins of improved mechanical properties such as three-point bending stiffness and shear strength can be obtained.

Such effects are exhibited markedly in a highly hydrolyzed resin having a degree of hydrolysis of 35% or more.

DETAILED DESCRIPTION OF THE INVENTION

1. Polymers produced through ring opening of 5-norbornene-2-carboxylate derivatives The 5-norbornene-2-carboxylate derivatives which can be used in the present invention, in general, can be synthesized by the Diels-Alder reaction of cyclopentadiene with an acrylic acid ester derivative or an α-alkyl substituted acrylic acid ester derivative.

The norbornene derivative monomers having ester groups such as methyl 5-norbornene-2-carboxylate, methyl 5-norbornene-2,2-methylcarboxylate, ethyl 5-norbornene-2-carboxylate, and octyl 5-norbornene-2-carboxylate can be readily caused to undergo polymerization through ring opening in the presence of a metathesis catalyst as described in Japanese Laid-Open Patent Application No. 77999/1974 Specification, and other references.

As the transition metal component of the metathesis catalyst, a tungsten compound or a molybdenum compound can be used. Especially, a tungsten halide is suitable because of its high activity. The organoaluminum component of the catalyst is not especially restricted. Ordinary alkylaluminums such as triethylaluminum, diethylaluminum monochloride, and ethylaluminum sesquichloride can be used therefor. As the third component, an oxygen-containing ligand such as an alcohol, a nitrogen-containing ligand such as pyridine, or a phosphorus-containing ligand such as triphenylphosphine, can be used.

For the solvent a halohydrocarbon, an aromatic hydrocarbon, an aromatic halohydrocarbon or the like can be used. Especially, an aromatic hydrocarbon such as toluene or an aromatic halohydrocarbon such as chlorobenzene is suitable because polymers can be obtained in a higher yield.

Polymerization is satisfactorily conducted under atmospheric pressure, but can also be conducted with pressurization.

The polymerization temperature is in the range of −20° C. to +70° C. but is preferably not lower than 0° C. because the activity is markedly lowered at too low a temperature.

The polymer obtained through ring opening of a 5-norbornene-2-carboxylate or its derivatives comprises a plurality of recurring units each represented by the formula

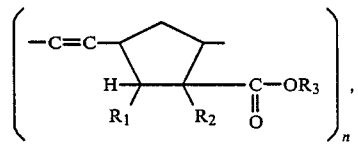

wherein: $R_1$ is hydrogen, an alkyl group or a phenyl group; $R_2$ is hydrogen or an alkyl group; $R_3$ is an alkyl group; and the above mentioned alkyl groups have 1 to 20 carbon atoms. A ring-opened polymer having an intrinsic viscosity of generally 0.2 to 4.0 and preferably 0.3 to 4.0, is used in the present invention.

When the intrinsic viscosity is less than 0.3, the impact property of the polymer resin itself is not sufficient. In this case, however, the polymer resin can be blended with a polymer having an intrinsic viscosity of 0.3 or more to increase its flowability.

A polymer obtained through ring opening containing 40% or more, preferably 45% or more, of the trans-form stereostructure due to the double bonds present in the structural units is used in the present invention. Such stereostructures can be obtained by controlling the polymerization conditions.

This polymer itself, however, has low thermal resistance because of its ester group. Thus, a polymer consisting of the ester-substituted compound cannot be used alone as a practical heat-resistant resin.

2. Dissolution of the polymer

The polymer having the above mentioned ester group of 5-norbornene-2-carboxylate or its derivative is dissolved in an organic solvent miscible with water.

Contamination of the solvent with a solvent for polymerization such as an aromatic hydrocarbon need not be especially avoided. It is desirable, however, that the polymer be separated to remove the polymerization solvent because the presence of the polymerization solvent makes it rather difficult to dissolve the polymer and to add an alkali compound.

Separation of the polymer is conducted by adding a solvent in which the polymer is insoluble, such as methanol, to the polymer solution obtained in the polymerization step. Thus the polymer is separated out, which is then subjected to drying as necessary.

Examples of organic solvents which can be used, and which dissolve the polymer and are miscible with water, are ketones, tetrahydrofuran, dioxane, dimethylformamide, and dimethylsulfoxide.

The amount of these organic solvents to be used depends on the species and viscosity of the polymer to be dissolved, and is generally in the range of 5 to 50 parts by weight per part by weight of the polymer. The polymer can be uniformly dissolved by adding an amount of this order of the solvent.

3. The first-step hydrolysis

The polymer dissolved in an organic solvent miscible with water is then subjected to a hydrolysis step.

As the alkali component for hydrolysis, a hydroxide or a salt with a weak acid of an alkali metal or an alkaline earth metal can be used. Among these alkali components, especially preferred are an alkali metal hydroxide such as sodium hydroxide, potassium hydroxide and lithium hydroxide as well as a salt with a weak acid of these alkali substances such as sodium carbonate, sodium acetate, potassium acetate and potassium carbonate.

These alkali substances are generally added in the form of an aqueous solution thereof in water or a mixture of water and an alcohol.

It is desirable that the amount of the alkali to be used by 0.35 mol or more per mol of the ester group contained in the polymer. When this amount is less than 0.35 mol, the degree of hydrolysis is lower, and thus uniform dissolution of the polymer is difficult at the time of the subsequent addition of water.

The total amount of the alkali to be used depends upon the desired degree of hydrolysis of the polymer. More specifically, when impact resistance and moldability are required, the degree of hydrolysis is in the range of 35% to 90%, wherein the total amount of the alkali to be used is 0.35 to 0.92 mol per mol of the ester group unit. When thermal resistance is required, the degree of hydrolysis is in the range of 70% to 100%, wherein the total amount of the alkali to be used is 0.7 to 3 mols per mol of the ester group unit.

The total amount of the alkali to be used can be added in the first hydrolysis step, or, alternatively, it is possible to add the minimum effective amount of the alkali in the first hydrolysis step and then to add the balance of the total amount in the second hydrolysis step.

The resulting liquid phase may separate into two phases. Such phase separation need not always be avoided. It is desirable, however, that a uniform phase be formed because control of the degree of the first-step hydrolysis would otherwise become difficult.

A suitable amount of the water to be used is generally in the range of 0.1 to 1 part by weight per the part by weight of the organic solvent used in the dissolution of the polymer.

The temperature for the hydrolysis step can be optionally selected in the range of 40° to 200° C., but the hydrolysis proceeds satisfactorily at a temperature of 50° to 80° C. As the reaction proceeds, the polymer is separated out and the reaction system becomes non-uniform. The hydrolysis step can be conducted under atmospheric pressure or under pressurization.

The first hydrolysis step is continued until at least a portion and preferably 10% by weight or more of the polymer is separated out, or until 35% or more of the ester groups contained in the polymer is hydrolyzed.

4. The second-step hydrolysis

After the polymer has been partially hydrolyzed and the solid polymer has been separated out, some water is added thereto to dissolve the solid polymer thus separated out, and at the same time the second-step hydrolysis treatment is carried out.

The amount of water to be added is an amount such as to redissolve the separated polymer. The second-step hydrolysis is carried out in a solvent containing water in an amount (as a total with the amount of water used in the first hydrolysis step) of at least 0.5 part and preferably 1 part or more by weight per part by weight of the organic solvent used.

After this addition of water, it is desirable that water or an aqueous alkali solution be added as the organic solvent is heated and evaporated off.

The amount of the alkali to be added is the difference of the amount of the alkali required for obtaining the desired degree of hydrolysis minus the amount thereof added in the first hydrolysis step. The alkali substance can be added by dissolving it in the above mentioned water to be added or as a separate aqueous solution thereof.

The temperature for the hydrolysis step is not especially restricted. The hydrolysis step is conducted with stirring for a period of 0.5 to 3 hours, generally at room temperature to 100° C., preferably at 50° to 100° C.

The second-step hydrolysis treatment comprises forming an aqueous solution by addition of water and then continuing the hydrolysis step, and is not a step of adding or not adding the alkali while the polymer is dissolved. Thus, it is not always necessary that the degree of hydrolysis of the polymer obtained by the first-step hydrolysis be increased by the second hydrolysis step. The thermal resistance of the polymer is increased by retreating it in an aqueous phase. The reasons for this increase in the thermal resistance have not yet been clarified, but one of the reasons therefor is considered to be the change in distribution of the hydrolyzed ester groups.

The thermal resistance and stiffness of the polymer can be further improved if the degree of hydrolysis is caused by the second hydrolysis step to proceed by 5% or more, preferably 10% or more.

Thus, it is preferable to discontinue the first hydrolysis step before the added alkali is exhausted and commence the second hydrolysis step by addition of water, or to further add 0.05 mol, preferably 0.1 mol, of the alkali per mol of the ester group contained in the polymer used in the second hydrolysis step.

The final degree of hydrolysis according to the present invention is 35% or more, preferably 40% to 98%, more preferably 43% to 95%.

5. Neutralization

The carboxylic acid salt moieties in the polymer are then converted into carboxylic acid moieties by addition of an acid, and the resulting product is obtained as a precipitate. The acid to be added is a conventional acid such as hydrochloric acid, nitric acid, acetic acid, or sulfuric acid. The amount of the acid to be added is preferably 1 to 10 equivalents to the amount of the carboxylic acid salt. The concentration of the acid to be added is not especially restricted.

In order to obtain the product in the form of a slurry, 0.2 to 0.7 equivalent, preferably 0.4 to 0.6 equivalent, of an acid is added to the carboxylic acid salt under stirring. The mixture is stirred for about 0.5 to 3 hours, preferably with high-speed stirring. Then the remaining amount of the acid is slowly added thereto. Thus, there is obtained a good powdery product.

If a specific amount of the neutralizing acid is added all at once in this neutralization reaction, alkali residues will be increased, and the flowability of the product will be lowered. Furthermore, the product is apt to be colored. Therefore, the acid should be divided into parts and added gradually.

The resulting neutralized polymer is washed and then dried to obtain the final product.

6. Analyses and determination of properties

The compositional proportions of the product were determined by infrared absorption spectrography.

The trans-form structure content of the product was determined by $^{13}$C-NMR spectrography.

The catalyst residue and alkali residue (except Na) in the product were analyzed by means of fluorescent X rays.

The intrinsic viscosity ($\eta$s/C) of the product was determined at 30° C. in tetrahydrofuran (concentration 0.1 g/dl).

The following properties were determined in accordance with the Japanese Industrial Standards (JIS): thermal deformation temperature according to JIS K-7207/1974; Izod impact strength according to JIS K-7110/1971 (three-ply 2 mm-thick test pieces); three-point bending stiffness according to JIS K-7203/1973; and shear strength according to JIS K-7214, respectively.

The present invention will be further described by way of the following examples. Throughout these examples, quantities expressed in parts are by weight unless otherwise specified.

EXAMPLE 1

A dry flask purged with nitrogen was charged with 400 parts of toluene used as a solvent and 100 parts of methyl 5-norbornene-2-carboxylate used as a monomer. The content temperature was adjusted to 15° C. The flask was further charged with 2.6 parts of tungsten hexachloride and then 3-fold mols of diethylaluminum monochloride relative to the amount of tungsten hexachloride, which step was then followed by addition of 2-fold mols of n-butanol relative to the amount of tungsten hexachloride. The mixture was subjected to polymerization through ring opening for 10 hours.

After termination of the polymerization reaction, the flask was charged with a mixture of 3-fold volume of methanol relative to the amount of toluene and 15 parts of concentrated hydrochloric acid, and the remaining catalyst was decomposed. The resulting product was purified twice by reprecipitation using tetrahydrofuran as a good solvent and methanol as a poor solvent and was then dried to obtain 99 parts of the ring-opened polymer. The intrinsic viscosity of the polymer was 0.55.

A 3-liter flask was charged with 100 parts of the resulting polymer and then 1,000 parts of acetone. The mixture was warmed to 56° C. and stirred to dissolve the polymer completely. An aqueous solution of 50 parts of potassium hydroxide in 600 parts of water was slowly added to the resulting acetone solution of the polymer so as to prevent lowering of the temperature of the reaction system. As the hydrolysis of ester groups proceeded, the ring-opened polymer was separated out in the reaction system (the estimated degree of hydrolysis being 50 to 60%).

After 2 hours, 600 parts of water was added to the reaction system, and the reaction was continued for another hour while the reaction temperature was maintained constant. After addition of water, the ring-opened polymer separated out in the reaction system was dissolved to form a uniform solution.

An aqueous solution of acetic acid was prepared by diluting 94 parts of acetic acid with 170 parts of water. Half the amount of the acetic acid solution was added to the aqueous solution of the polymer. The resulting mixture was stirred for 1 hour, and then the remaining half amount of the acetic acid solution was added thereto. The polymer was precipitated in the form of white powder, which was then filtered. Thus, there was obtained the objective polymer of 5-norbornene-2-carboxylic acid and methyl 5-norbornene-2-carboxylate.

The properties of the resulting product are shown in Table 1.

EXAMPLE 2

The process of Example 1 was repeated except that the 50 parts of potassium hydroxide was reduced to 30 parts.

The properties of the product are shown in Table 1.

EXAMPLE 3

The process of Example 1 was repeated except that the 50 parts of potassium hydroxide was reduced to 20 parts.

The properties of the product are shown in Table 1.

EXAMPLE 4

The process of Example 1 was repeated except that hydrolysis of the ester groups was conducted by using 36 parts of sodium hydroxide instead of potassium hydroxide.

The properties of the product are shown in Table 1.

EXAMPLE 5

The process of Example 3 was repeated except that hydrolysis of the ester groups was conducted by using tetrahydrofuran instead of acetone.

The properties of the product are shown in Table 1.

EXAMPLE 6

The polymerization process of Example 1 was repeated except that octyl 5-norbornene-2-carboxylate monomer was used instead of methyl 5-norbornene-2-carboxylate monomer. As a result, 97 parts of the polymer having an intrinsic viscosity of 0.62 was obtained.

Hydrolysis was conducted under the same conditions as in Example 2.

The properties of the product are shown in Table 1.

EXAMPLE 7

The process of Example 1 was repeated except that hydrolysis was conducted by using 30 parts of the potassium hydroxide out of the 50 parts thereof in the first hydrolysis step and adding the remaining potassium hydroxide as an aqueous solution thereof in the second hydrolysis step.

The properties of the product are shown in Table 1.

COMPARATIVE EXAMPLE 1

The process of Example 1 was repeated except that water was not added, and an acid was added in the second hydrolysis step. The properties of the resulting polymer are shown in Table 2 in comparison with those of Example 1.

COMPARATIVE EXAMPLE 2

The process of Example 2 was repeated except that water was not added, and an acid was added in the second hydrolysis step. The properties of the resulting polymer are shown in Table 2.

COMPARATIVE EXAMPLE 3

The process of Example 3 was repeated except that water was not added, and an acid was added in the second hydrolysis step. The properties of the resulting polymer are shown in Table 2.

TABLE 1

| Example | Intrinsic Viscosity | Compositional Proportion (%) | | Thermal Deformation Temperature (°C.) | Izod Impact Strength (Kg · cm/cm) | Three-point Bending Modulus (Kg/cm$^2$) | Shear Strength (Kg/cm$^2$) |
|---|---|---|---|---|---|---|---|
| | | carboxylic acid | ester | | | | |
| 1 | 0.55 | 97 | 3 | 165 | 40.1 | 32,000 | >970 |

TABLE 1-continued

| Example | Intrinsic Viscosity | Compositional Proportion (%) carboxylic acid | Compositional Proportion (%) ester | Thermal Deformation Temperature (°C.) | Izod Impact Strength (Kg · cm/cm) | Three-point Bending Modulus (Kg/cm$^2$) | Shear Strength (Kg/cm$^2$) |
|---|---|---|---|---|---|---|---|
| 2 | 0.55 | 80 | 20 | 141 | >420 | 28,600 | 940 |
| 3 | 0.55 | 57 | 43 | 116 | >420 | 26,300 | 910 |
| 4 | 0.55 | 95 | 5 | 159 | 35.7 | 31,200 | >970 |
| 5 | 0.55 | 50 | 50 | 102 | >420 | 26,000 | 860 |
| 6 | 0.62 | 85 | 15 | 132 | >420 | 27,000 | >970 |
| 7 | 0.52 | 97 | 3 | 163 | 42.3 | 32,000 | >970 |

TABLE 2

| | Intrinsic Viscosity | Residue (ppm) W | Residue (ppm) Al | Residue (ppm) K | Compositional Proportion (%) carboxylic acid | Compositional Proportion (%) ester | Thermal Deformation Temperature (°C.) | Izod Impact Strength (Kg · cm/cm) | Three-point Bending Modulus (Kg/cm$^2$) | Shear Strength (Kg/cm$^2$) |
|---|---|---|---|---|---|---|---|---|---|---|
| Ex. 1 | 0.55 | 84 | 32 | 30 | 97 | 3 | 165 | 40.1 | 32,000 | >970 |
| Com. Ex. 1 | 0.55 | 150 | 250 | 480 | 100 | 0 | 123 | 12 | 24,300 | 640 |
| Ex. 2 | 0.55 | 64 | 80 | 40 | 80 | 20 | 141 | >420 | 28,600 | >970 |
| Com. Ex. 2 | 0.55 | 170 | 200 | 510 | 82 | 18 | 110 | >420 | 23,800 | 670 |
| Ex. 3 | 0.55 | 90 | 68 | 70 | 57 | 43 | 116 | >420 | 26,300 | 940 |
| Com. Ex. 3 | 0.55 | 200 | 230 | 830 | 50 | 50 | 85 | >420 | 22,300 | 670 |

What is claimed is:

1. A process for preparing a heat-resistant resin which comprises: dissolving in an organic solvent miscible with water a polymer produced through ring opening of a 5-norbornene-2-carboxylate or a derivative thereof, said polymer comprising a recurring unit represented by the formula

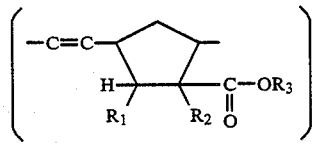

wherein $R_1$ is hydrogen, an alkyl group or a phenyl group, $R_2$ is hydrogen or an alkyl group, and $R_3$ is an alkyl group; adding an alkali to the resulting solution; subjecting the resulting mixture to a first-step hydrolysis treatment until at least a portion of the polymer is separated out; dissolving the polymer which has separated out by adding water to the reaction mixture; optionally adding an alkali to the solution; subjecting the resulting solution to a second-step hydrolysis treatment in the presence of an alkali which is selected from an alkali present in the first-step hydrolysis and an alkali added during the second step hydrolysis; and then neutralizing the resulting hydrolyzate with an acid.

2. The process according to claim 1 in which the intrinsic viscosity of the polymer of the 5-norbornene-2-carboxylate or a derivative thereof is in the range of 0.3 to 4.0.

3. The process according to claim 1 in which 40 percent or more of the double bonds in the structural units of which the polymer of the 5-norbornene-2-carboxylate or a derivative thereof is contained is of the transform.

4. The process according to claim 1 in which the organic solvent miscible with water is selected from ketones, tetrahydrofuran, dioxane, dimethylformamide, dimethylsulfoxide and mixtures thereof.

5. The process according to claim 1 in which the first-step hydrolysis is carried out by addition of at least 0.35 mol of an alkali substance per mol of the ester group contained in the polymer.

6. The process according to claim 1 in which the first-step hydrolysis prior to addition of water is carried out by addition of at least 0.35 mol of an alkali per mol of the ester group contained in the polymer, and after dissolving the separated-out polymer by adding water to the reaction mixture at least 0.05 mol of an alkali per mol of the ester group is added to the solution in order to carry out the second-step hydrolysis treatment.

7. The process according to claim 1, in which the first-step hydrolysis is carried out in an organic solvent containing not more than 0.5 part by weight of water per part by weight of the solvent, and the second-step hydrolysis is carried out in an organic solvent containing more than 0.5 part by weight of water per part by weight of the solvent.

8. The process according to claim 1, in which the second-step hydrolysis is carried out as the organic solvent is evaporated off under heating.

* * * * *